US 8,331,677 B2

(12) United States Patent
Foehr et al.

(10) Patent No.: US 8,331,677 B2
(45) Date of Patent: Dec. 11, 2012

(54) COMBINED IMAGE AND TEXT DOCUMENT (75) Inventors: Oliver H. Foehr, Bellevue, WA (US); Alan John Michaelis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1006 days.

(21) Appl. No.: 12/350,520

(22) Filed: Jan. 8, 2009

(65) Prior Publication Data

US 2010/0172590 A1    Jul. 8, 2010

(51) Int. Cl.
G06K 9/00    (2006.01)
(52) U.S. Cl. .................. 382/181; 382/217; 382/254
(58) Field of Classification Search .............. 382/254, 382/217, 181
See application file for complete search history.

(56) References Cited

U.S. PATENT DOCUMENTS

| | | | | |
|---|---|---|---|---|
| 5,428,721 A * | 6/1995 | Sato et al. ................ 345/650 |
| 5,729,635 A | 3/1998 | Fast et al. |
| 5,745,600 A | 4/1998 | Chen et al. |
| 5,761,328 A * | 6/1998 | Solberg et al. ............ 382/113 |
| 5,999,666 A | 12/1999 | Gobeli et al. |
| 6,097,834 A | 8/2000 | Krouse et al. |
| 6,327,393 B1 * | 12/2001 | Bruder ........................ 382/256 |
| 6,356,923 B1 * | 3/2002 | Yano et al. .................. 717/127 |
| 7,389,181 B2 * | 6/2008 | Meadow et al. ............ 701/522 |
| 2002/0114522 A1 * | 8/2002 | Seeber ......................... 382/218 |
| 2003/0023486 A1 * | 1/2003 | Pavelka ......................... 705/14 |
| 2003/0177115 A1 | 9/2003 | Stern et al. |
| 2004/0083119 A1 | 4/2004 | Schunder et al. |
| 2004/0197029 A1 * | 10/2004 | Brundage et al. ........... 382/306 |
| 2005/0114351 A1 * | 5/2005 | Yano et al. .................... 707/10 |
| 2005/0160369 A1 * | 7/2005 | Balabanovic et al. ....... 715/766 |
| 2005/0210008 A1 * | 9/2005 | Tran et al. ..................... 707/3 |
| 2007/0033170 A1 * | 2/2007 | Sull et al. ...................... 707/3 |
| 2007/0047841 A1 * | 3/2007 | Berkner et al. .............. 382/298 |
| 2007/0201757 A1 * | 8/2007 | Madej et al. ................. 382/254 |
| 2008/0075320 A1 | 3/2008 | Golovchinsky |
| 2009/0196501 A1 * | 8/2009 | Ma .............................. 382/169 |

FOREIGN PATENT DOCUMENTS

JP    2006277001    10/2006
(Continued)

OTHER PUBLICATIONS

Phelps, et al., "Multivalent Documents: A New Model for Digital Documents", retrieved at <<http://www.eecs.berkeley.edu/Pubs/TechRpts/1998/CSD-98-999.pdf>>, pp. 1-44, 1998.

(Continued)

Primary Examiner — Hadi Akhavannik
(74) Attorney, Agent, or Firm — Wolfe-SBMC (57) ABSTRACT A combined image and text document is described. In embodiment(s), a scanned image of a document can be generated utilizing a scanning application, and text representations of text that is included in the document can be generated utilizing a character recognition application. Position data of the text representations can be correlated with locations of corresponding text in the scanned image of the document. The scanned image can then be rendered for display overlaid with the text representations as a transparent overlay, where the scanned image and the text representations are independently user-selectable for display. A user-selectable input can be received to display the text representations without the scanned image, the scanned image without the text representations, or to display the text representations adjacent the scanned image.

18 Claims, 5 Drawing Sheets

FOREIGN PATENT DOCUMENTS

JP 2007323415 12/2007

OTHER PUBLICATIONS

Wilensky Robert., "Toward Work-Centered Digital Information Services", retrieved at <<http://www.ncsi.iisc.ernet.in/raja/is214/is214-2006-01-04/dli1/dli1-ucb.htm>>, Aug. 29, 2008, pp. 1-14.

"PDF Searchable Images", retrieved at <<http://www.alliancegroup.co.uk/pdf-searchable-images.htm>>, Aug. 29, 2008, pp. 1-3.

"AquaForest", "Creating Searchable PDFs from Scanned Documents—A Guide", retrieved at <<http://www.aquaforest.com/files/Searchable%20PDF.pdf>>, Jan. 2006, pp. 1-3.

"Adobe Acrobat 9 Standard (not your Version)", "Recognize Text in Scanned Documents", retrieved at <<http://help.adobe.com/en_US/Acrobat/9.0/Standard/WS2A3DD1FA-CFA5-4cf6-B993-159299574AB8.w.html>>, Aug. 29, 2008, pp. 1-2.

"PCT Search Report and Written Opinion", Application No. PCT/US2009/066617, (Jun. 24, 2010), 11 pages.

\* cited by examiner

COMBINED IMAGE AND TEXT DOCUMENT

BACKGROUND

A printed or other paper document can be scanned as an image and saved as an electronic document. A scanned image of a document provides an accurate visual representation of the document's content, such as text of the document, handwritten notes, a written signature, a watermark, and/or other visual markings. However, the text of a document in a scanned image cannot be searched for, selected, and/or copied.

Optical character recognition (OCR) technology is typically utilized to convert document text from an original document, or document text in a scanned image, into an editable text representation that enables the text to be searched, selected, and/or copied. However, a text representation of document text is typically generated as a text file that does not retain the visual appearance or representation of an original document. For example, original document features such as the formatting, layout, and artifacts of the original document, as well as handwritten notes, a written signature, a watermark, and/or other visual markings are not retained when a text file of a document is generated.

SUMMARY

This summary is provided to introduce simplified concepts of a combined image and text document. The simplified concepts are further described below in the Detailed Description. This summary is not intended to identify essential features of the claimed subject matter, nor is it intended for use in determining the scope of the claimed subject matter.

A combined image and text document is described. In embodiments, a scanned image of a document can be generated utilizing a scanning application, and text representations of text that is included in the document can be generated utilizing a character recognition application. Position data of the text representations can be correlated with locations of corresponding text in the scanned image of the document. The scanned image can then be rendered for display overlaid with the text representations as a transparent overlay, where the scanned image and the text representations are independently user-selectable for display. A user-selectable input can be received to display the text representations without the scanned image, the scanned image without the text representations, or to display the text representations adjacent the scanned image.

In other embodiments of a combined image and text document, a markup document can be generated that includes the text representations, associated display alignment information, and a reference to the scanned image for display. Selected text can be searched from the text representations, and the transparent overlay of the selected text can be highlighted to display an appearance that the corresponding text in the scanned image is highlighted. In an alternate embodiment, the text representations can be rendered as a visual overlay for display over the scanned image to illustrate a comparison of the text representations with the corresponding text in the scanned image that reflects an accuracy of the character recognition application. Additionally, the scanned image can be displayed in a first color overlaid with the text representations displayed in a second color that contrasts with the first color to further illustrate the comparison of the text representations with the corresponding text in the scanned image.

BRIEF DESCRIPTION OF THE DRAWINGS

Embodiments of a combined image and text document are described with reference to the following drawings. The same numbers are used throughout the drawings to reference like features and components.

DETAILED DESCRIPTION

Embodiments of a combined image and text document provide that a document can be scanned to generate a scanned image of the document. Text representations of text that is included in the document can then be generated from the original document or from the scanned image. A markup document can be generated that includes the text representations of the text that is included in the original document, associated display alignment information, and a reference to the scanned image. The scanned image can then be displayed and overlaid with the text representations as a transparent overlay of the scanned image. In an embodiment, selected text can be searched for in the text representations and/or searched for in the markup document, and the transparent overlay of the selected text can be highlighted to display an appearance that the corresponding text in the scanned image is highlighted.

The scanned image and the text representations can also be independently user-selectable for display. For example, a user can initiate a user input to display the text representations adjacent the scanned image on a display so that both the scanned image and the text representations are viewable side-by-side. Alternatively, a user can select to display just the text representations without the scanned image, or just the scanned image without the text representations.

While features and concepts of the described systems and methods for a combined image and text document can be implemented in any number of different environments, systems, and/or various configurations, embodiments of a combined image and text document are described in the context of the following example systems and environments.

Figure 1:
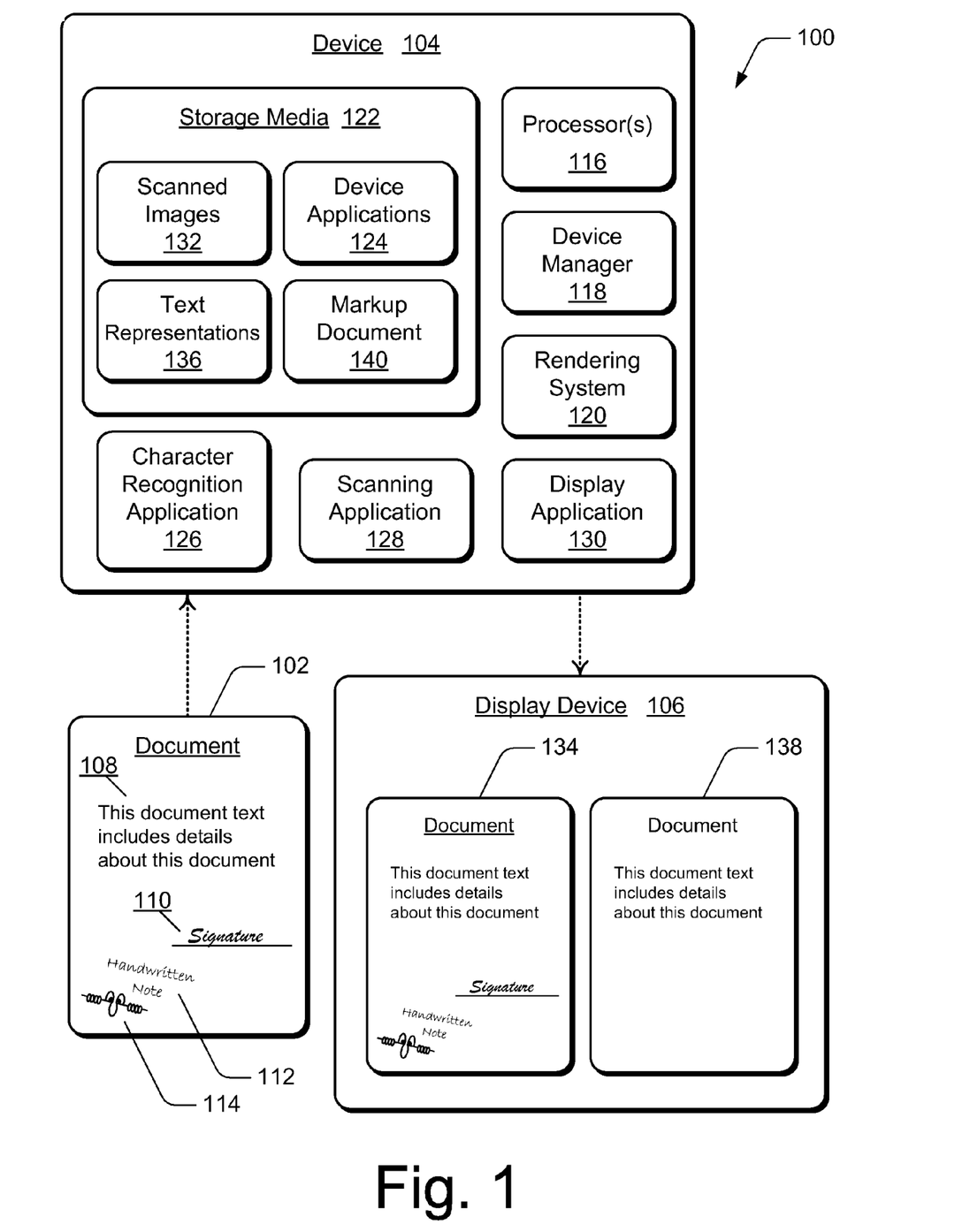
FIG. 1 illustrates an example system in which embodiments of a combined image and text document can be implemented.

FIG. 1 illustrates an example system 100 in which various embodiments of a combined image and text document can be implemented. Example system 100 is a document representation system that includes an example document 102, a device 104 that can be implemented to process the document, and a display device 106. The example document 102 includes text 108, a handwritten signature 110, a handwritten note 112, and an image 114. An example document may also include a watermark, page number, multiple pages, and/or other visual markings.

Device 104 can be implemented as a computer device that includes document processing features to scan and copy a document. Alternatively or in addition, device 104 can be connected to a multi-function device or independent devices that scan, copy, and/or otherwise manage and process documents. Device 104 can be implemented with processors, communication components, data inputs, memory components, processing and control circuits, and a content rendering system. Device 104 can also be implemented with any number and combination of differing components as described with reference to the example device shown in FIG. 5. Device 104 may also be associated with a user (i.e., a person) and/or an entity that operates the device such that a device describes logical devices that include users, software, and/or a combination of devices.

In this example, device 104 includes one or more processors 116 (e.g., any of microprocessors, controllers, and the like) that process various computer-executable instructions to implement embodiments of a combined image and text document. Alternatively or in addition, device 104 can be implemented with any one or combination of hardware, firmware, or fixed logic circuitry that is implemented in connection with processing and control circuits. Although not shown, device 104 can include a system bus or data transfer system that couples the various components within the device, or to other devices. Device 104 can also include communication interfaces that can be implemented as a serial and/or parallel interface, a wireless interface, any type of network interface, a modem, and/or as any other type of communication interface. The communication interfaces provide connection and/or communication links between device 104 and a communication network (e.g., LAN, WLAN) and/or other document processing devices.

Client device 104 can also include a device manager 118 (e.g., a control application, software application, signal processing and control module, code that is native to a particular device, a hardware abstraction layer for a particular device, etc.). Client device 104 also includes a rendering system 120 that can be implemented to render scanned images, text representations, and/or a user interface for display at display device 106 to implement embodiments of a combined image and text document.

Device 104 also includes storage media 122 to store or otherwise maintain various data and information. The storage media 122 can be implemented as any type of memory, magnetic or optical disk storage, and/or other suitable electronic data storage. The storage media 122 can also be referred to or implemented as computer-readable media, such as one or more memory components, that provide data storage mechanisms to store various device applications 124 and any other types of information and/or data related to operational aspects of device 104. For example, an operating system and/or software modules and components can be maintained as computer applications with storage media 122 and executed on processors 116.

Device 104 includes a character recognition application 126, a scanning application 128, and a display application 130 that can each be implemented as computer-executable instructions and executed by processors 116 to implement embodiments of a combined image and text document. The character recognition application 126, scanning application 128, and display application 130 are examples of device applications 124 that can be maintained by the storage media 122. Although illustrated and described as applications of device 104, the device applications, as well as other functionality to implement the various embodiments described herein, can be provided as a service or as devices apart from device 104 (e.g., on a separate device or by a third party service).

The scanning application 128 can be implemented to scan documents and generate scanned images 132 that can be maintained with the storage media 122 at device 104. For example, the scanning application 128 can scan document 102 and generate a scanned image 134 of the document as shown on display device 106. A scanned image can be generated in any applicable format, and may employ a compression scheme such as TIFF, FAX G3/G4, PNG, JPEG, MRC, XPS, PDF, and the like.

The character recognition application 126 can be implemented to scan documents and generate text representations 136 of text that is included in the documents. For example, the character recognition application 126 can scan document 102 and generate text representations 138 of the text 108 that is included in document 102, as shown on display device 106. Text representations can be generated utilizing any applicable optical character recognition (OCR) technique or algorithm.

In this example, the text representations 138 are displayed adjacent the scanned image 134 on display device 106. In embodiments, the scanned image 134 and the text representations 138 are independently user-selectable for display. The display application 130 can receive a user-selectable input at device 104 to initiate the display of the text representations 138 adjacent the scanned image 134 so that both the scanned image and the text representations are viewable side-by-side. Alternatively, the display application 130 can receive a user-selectable input at device 104 to initiate a display of the text representations 138 without the scanned image, or a display of the scanned image 134 without the text representations. The character recognition application 126 can also be implemented to correlate position data of the text representations 138 with locations of corresponding original text 108 in the scanned image 134 of the document 102 when generating the text representations for display.

The display application 130 can be implemented to correlate with the rendering system 120 to manage the display of scanned images and text representations on display device 106. The display application 130 can also be implemented to generate a markup document 140 that includes the text representations 138, associated display alignment information, and a reference to the scanned image 134. The markup document 140 can be implemented as an XML-based markup, or in any other applicable format that describes a page for display on display device 106. In an embodiment, a markup document can include data that represents both the scanned image 134 and the text representations 138 for display. In an implementation, the markup document 140, and a document package containing the scanned image 134 and the markup document 140, can be generated directly on a scanning device and/or generated utilizing scanning application 128.

An example of the markup document 140 for the scanned image 134 and the text representations 138 in this example can include:

```
<FixedPage Width="836" Height="1024"
    <FixedPage.Resources>
        <ResourceDictionary>
            <ImageBrush x:Key="Image1"
            ImageSource="scanned image 134"
                Viewbox="0,0,718,260"
                Stretch="Fill"
                TileMode="None"
                ViewboxUnits="Absolute"
                ViewportUnits="Absolute"
                Viewport="91.5,79.5,359,130" />
        </ResourceDictionary>
    </FixedPage.Resources>
        <Path Fill="{StaticResource Image1}" Data="M
    91.5,79.5 L 450.5,79.5 450.5,209.5 91.5,209.5 z" />
        <Glyphs UnicodeString="Document" OriginX="96"
```

-continued

```
OriginY="96" FontRenderingEmSize="16" Fill="#00FFFFFF"
FontUri="arial" xml:lang="en-US" ocr:Source="Image1" />
    <Glyphs UnicodeString="This document text"
OriginX="96" OriginY="120" FontRenderingEmSize="12"
Fill="#00FFFFFF" FontUri="arial" xml:lang="en-US"
ocr:Source="Image1"/>
    <Glyphs UnicodeString="includes details"
OriginX="96" OriginY="135" FontRenderingEmSize="12"
Fill="#00FFFFFF" FontUri="arial" xml:lang="en-US"
ocr:Source="Image1"/>
    <Glyphs UnicodeString="about this document"
OriginX="96" OriginY="150" FontRenderingEmSize="12"
Fill="#00FFFFFF" FontUri="arial" xml:lang="en-US"
ocr:Source="Image1"/>
</FixedPage>
```

This example markup document 140 includes a FixedPage Resources section that references scanned image 134 and associated display and alignment information. The example markup document 140 also includes glyph elements that are represented by a path element in the document. The glyph elements each include a UnicodeString attribute that is a line of text representation from the text in the original document 102. In an embodiment, a glyph element includes a Fill attribute (e.g., Fill="#00FFFFFF") that is a code for a transparent color value that defines a text element display as transparent characters. An unmodified viewer application (e.g., display application 130) can utilize existing functionality for text selection, search, copy, screen reading, and/or other functionality to process the transparent (e.g., invisible, non-viewable) text representations. An optional attribute can be attached to each transparent text element that indicates to a viewer application that the text was generated with an OCR technique from the underlying scanned image.

Figure 2:
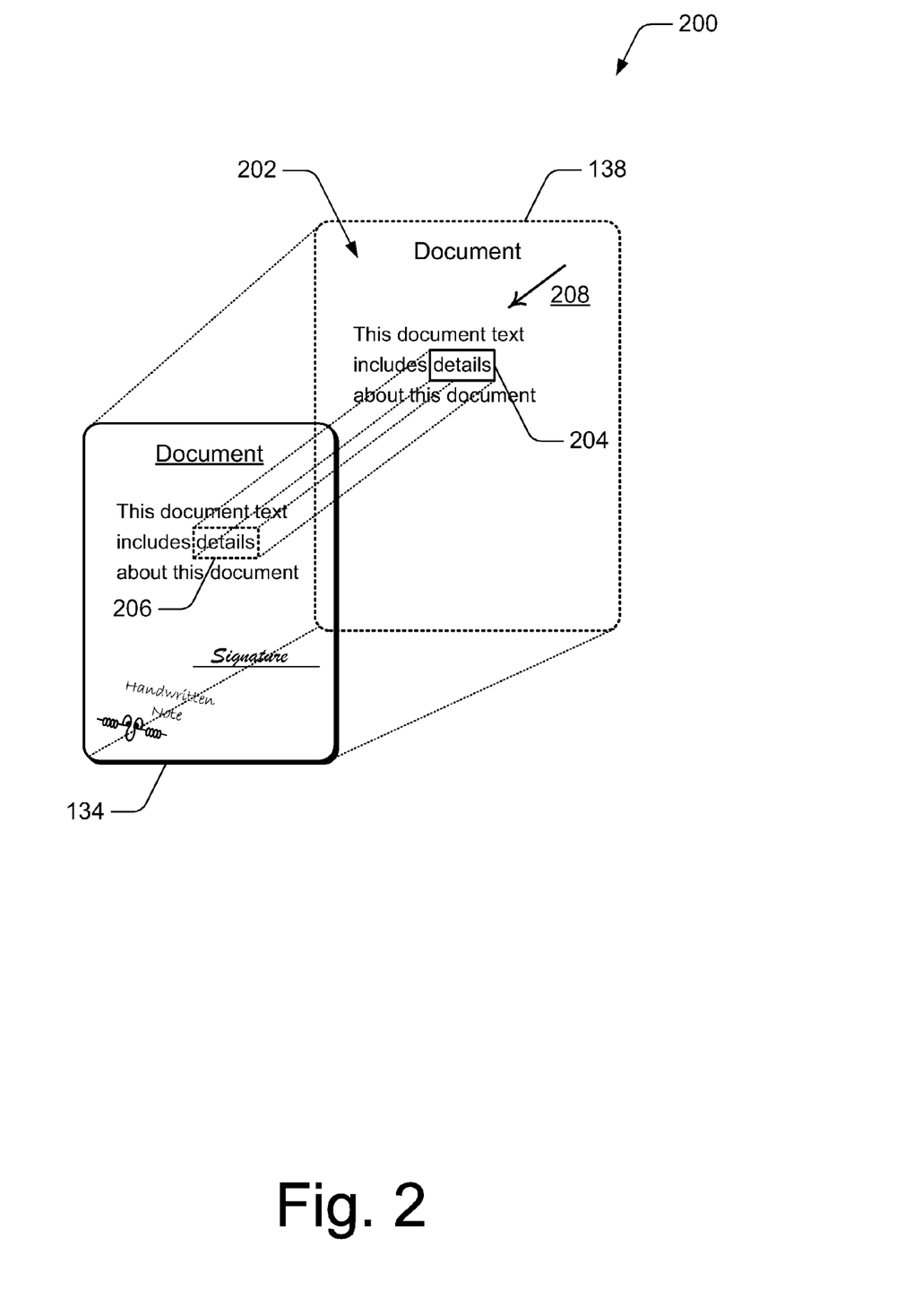
FIG. 2 illustrates an example combined image and text document in accordance with one or more embodiments.

FIG. 2 illustrates an example 200 of a combined image and text document displayed on a display device in accordance with one or more embodiments. The example 200 illustrates a display of the scanned image 134 overlaid with the text representations 138 as a transparent overlay 202. In an embodiment, the display application 130 can be implemented to receive a text search request for selected text (e.g., a word or phrase), initiate a search for the selected text in the text representations 138, and then highlight the transparent overlay of the selected text to display an appearance that the corresponding text in the scanned image is highlighted. For example, the display application 130 can receive a text search request for the text "details" that is included in the original document 102, and initiate a search for the text in the text elements of the markup document 140. When the selected text is located, the text can be highlighted at 204 to display an appearance that the corresponding text in the scanned image 134 is highlighted at 206 when viewed through the transparent overlay 202 at viewing angle 208.

In this example, the text representations 138 are shown as being displayed offset from the scanned image 134, when in practice the text representations 138 are displayed over the scanned image 134 such that the text representations line up over the corresponding text in the scanned image 134. In addition, the text representations 138 are visible in this example of a transparent overlay for discussion purposes only. As described above, the text representations can also be transparent text characters displayed over the scanned image 134 in a transparent color so that a viewer would only see the content of the scanned image.

In an alternate embodiment, the text representations 138 can be initiated for display as a visual overlay (rather than as a transparent overlay) for display over the scanned image 134 to illustrate a comparison of the text representations 138 with the corresponding text in the scanned image 134. A visible comparison of the text representations 138 with the scanned image 134 can serve to reflect an accuracy of the character recognition application 126 that is utilized to generate the text representations. A user can visualize and discern any differences or inaccuracies in the OCR technique utilized to generate the text representations 138.

In another embodiment, the scanned image 134 can be displayed in a first color overlaid with the text representations 138 displayed in a second color that contrasts with the first color to further illustrate a comparison of the text representations 138 with the corresponding text in the scanned image 134. Utilizing a semi-transparent fill color for the text representations 138, a user can directly verify which portions of the scanned image 134 were correctly recognized as text when the text representations 138 are generated.

Example methods 300 and 400 are described with reference to respective FIGS. 3 and 4 in accordance with one or more embodiments of a combined image and text document. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. Example method 300 may be described in the general context of computer-executable instructions, which can include software, applications, routines, programs, objects, components, data structures, procedures, modules, functions, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
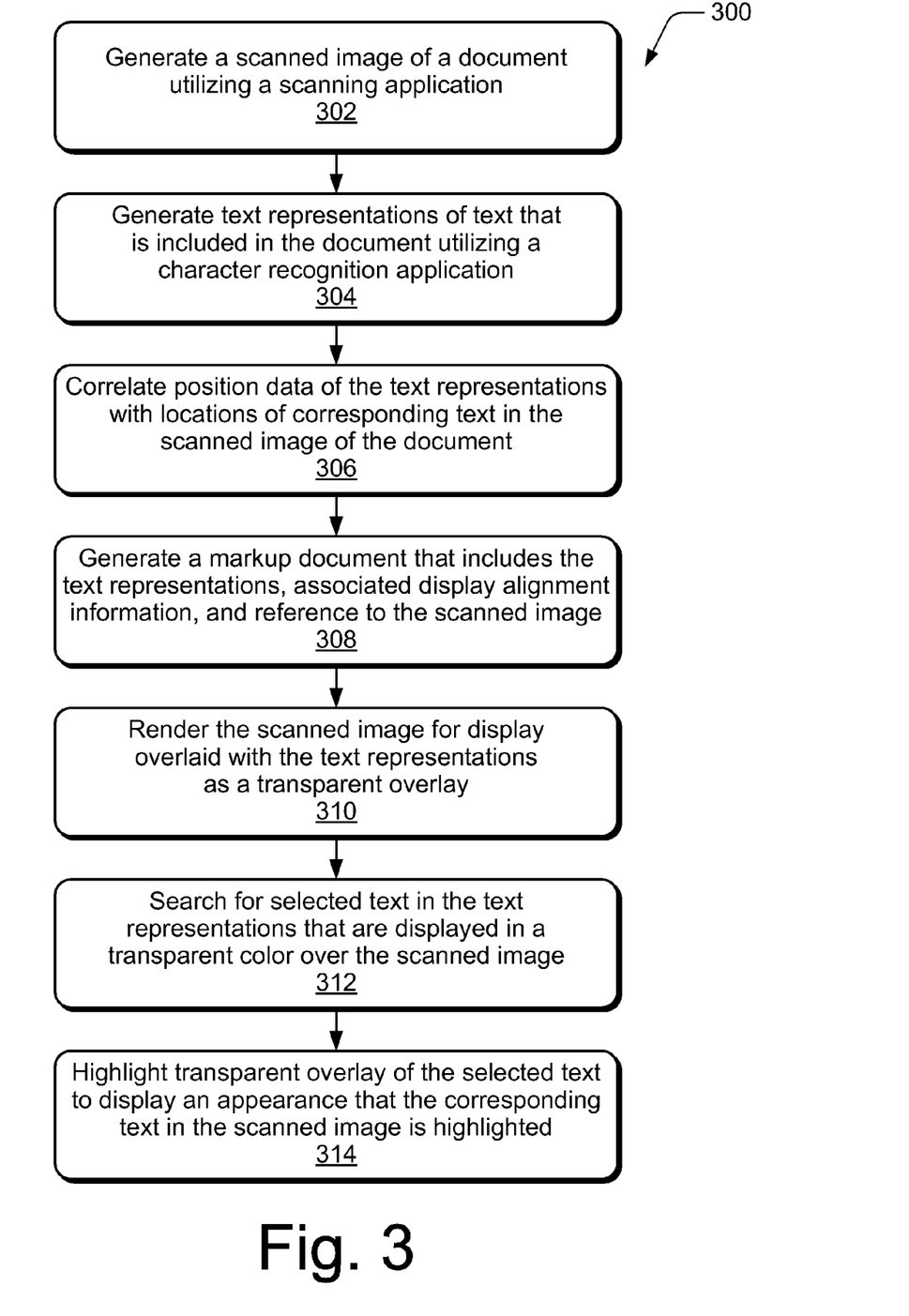
FIG. 3 illustrates example method(s) for a combined image and text document in accordance with one or more embodiments.

FIG. 3 illustrates example method(s) 300 of a combined image and text document. The order in which the method is described is not intended to be construed as a limitation, and any number of the described method blocks can be combined in any order to implement the method, or an alternate method.

At block 302, a scanned image of a document is generated utilizing a scanning application. For example, scanning application 128 at device 104 (FIG. 1) generates a scanned image 134 of document 102. The scanned image 134 includes an image of the original document text 108, a handwritten signature 110, a handwritten note 112, and an image 114. At block 304, text representations of the text that is included in the document is generated utilizing a character recognition application. For example, character recognition application 126 at device 104 generates text representations 138 of text 108 that is included in document 102.

At block 306, position data of the text representations is correlated with locations of corresponding text in the scanned image of the document. For example, character recognition application 126 correlates position data of the text representations 138 with locations of corresponding original text 108 in the scanned image 134 of document 102 when generating the text representations.

At block 308, a markup document is generated that includes the text representations, associated display alignment information, and a reference to the scanned image for display. For example, display application 130 at device 104 generates the markup document 140 that includes the text representations 138, associated display alignment information, and a reference to the scanned image 134. In an embodiment, a markup document can include data that represents both the scanned image 134 and the text representations 138 for display.

At block 310, the scanned image is rendered for display overlaid with the text representations as a transparent overlay. For example, a display of the scanned image 134 is overlaid with the text representations 138 as a transparent overlay 202 (FIG. 2). In embodiments, the scanned image 134 and the text representations 138 are independently user-selectable for display. The display application 130 at device 104 can receive a user-selectable input to initiate the display of the text representations 138 adjacent the scanned image 134. Alternatively, the display application 130 can receive a user-selectable input to initiate a display of the text representations 138 without the scanned image, or a display of the scanned image 134 without the text representations.

At block 312, selected text is searched for in the text representations that are displayed in a transparent color over the scanned image and, at block 314, the transparent overlay of the selected text is highlighted to display an appearance that the corresponding text in the scanned image is highlighted. For example, display application 130 receives a text search request for the text "details" that is included in the original document 102, and initiates a search for the selected text in the text elements of the markup document 140. When the selected text is located, the text is highlighted at 204 to display an appearance that the corresponding text in the scanned image 134 is highlighted at 206 when viewed through the transparent overlay 202 at viewing angle 208.

Figure 4:
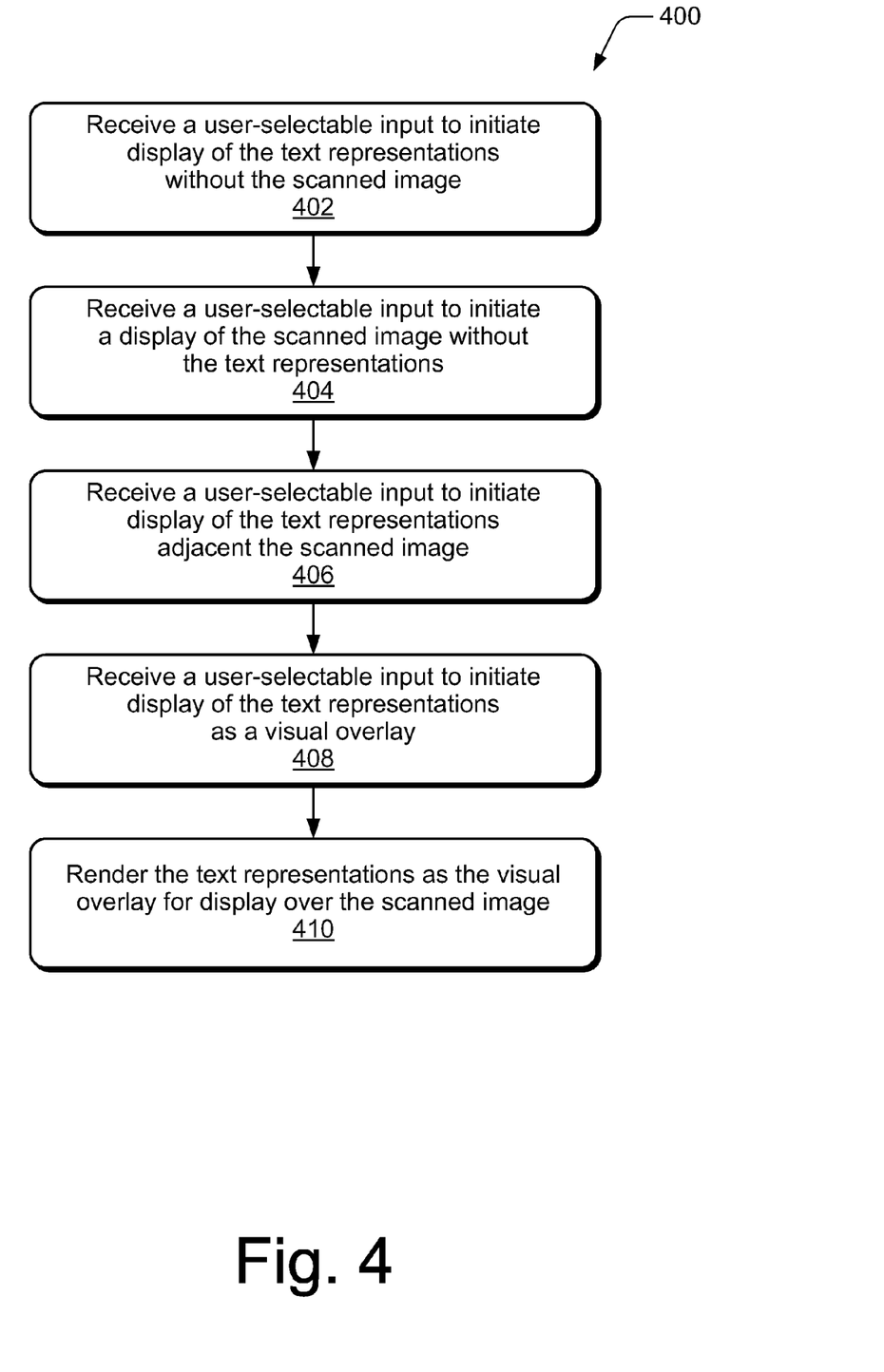
FIG. 4 illustrates example method(s) for a combined image and text document in accordance with one or more embodiments.

FIG. 4 illustrates example method(s) 400 of a combined image and text document. The order in which the method is described is not intended to be construed as a limitation, and any number of the described method blocks can be combined in any order to implement the method, or an alternate method.

At block 402, a user-selectable input is received to initiate display of the text representations without the scanned image. For example, the scanned image 134 and the text representations 138 (FIG. 1) are independently user-selectable for display, such as by a user at device 104. The display application 130 receives a user-selectable input at device 104 to initiate a display of the text representations 138 without the scanned image 134. Alternatively at block 404, a user-selectable input is received to initiate a display of the scanned image without the text representations. For example, display application 130 receives a user-selectable input at device 104 to initiate a display of the scanned image 134 without the text representations 138. A user can toggle between displaying the scanned image 134 and the text representations 138 on display device 106.

At block 406, a user-selectable input is received to initiate display of the text representations adjacent the scanned image. For example, display application 130 receives a user-selectable input at device 104 to initiate a display of the text representations 138 adjacent the scanned image 134, such as shown on display device 106 (FIG. 1). The text representations 138 can be displayed adjacent the scanned image 134 on display device 106 so that both the scanned image and the text representations are viewable side-by-side.

At block 408, a user-selectable input is received to initiate display of the text representations as a visual overlay and, at block 410, the text representations are rendered as the visual overly for display over the scanned image. For example, display application 130 receives a user-selectable input at device 104 to initiate a display of the text representations 138 as a visual overlay, rather than as a transparent overlay on the scanned image 134. The text representations 138 can be displayed as a visual overlay (e.g., the text characters are visual rather than transparent) to illustrate a comparison of the text representations 138 with the corresponding text in the scanned image 134 that reflects an accuracy of the character recognition application 126 that is utilized to generate the text representations. In an embodiment, the scanned image 134 is displayed in a first color overlaid with the text representations 138 displayed in a second color that contrasts with the first color to further illustrate the comparison of the text representations 138 with the corresponding text in the scanned image 134.

Figure 5:
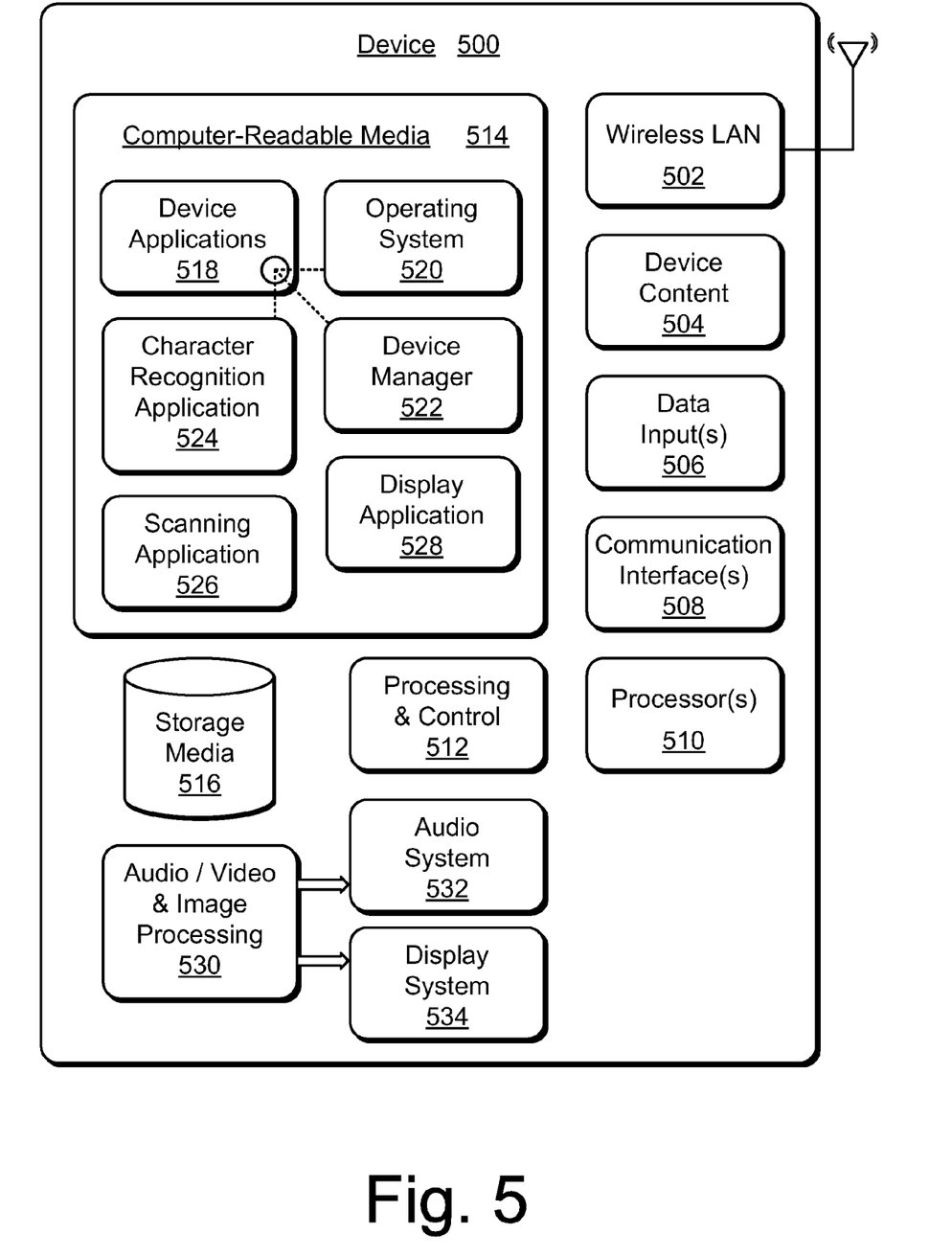
FIG. 5 illustrates various components of an example device that can implement embodiments of a combined image and text document.

FIG. 5 illustrates various components of an example device 500 that can be implemented as any type of device, such as the device described with reference to FIG. 1 to implement embodiments of a combined image and text document. In various embodiments, device 500 can be implemented as any one or combination of a wired and/or wireless device, computer device, portable computer device, media device, communication device, document processing and/or rendering device, appliance device, electronic device, and/or as any other type of device that can be implemented to process and manage documents. Device 500 may also be associated with a user (i.e., a person) and/or an entity that operates the device such that a device describes logical devices that include users, software, firmware, and/or a combination of devices.

Device 500 includes wireless LAN (WLAN) components 502, that enable wireless communication of device content 504 or other data (e.g., received data, data that is being received, data scheduled for broadcast, data packets of the data, etc.). The device content 504 can include configuration settings of the device, scanned images, text representations, markup documents, and/or information associated with a user of the device. Device 500 can also include one or more data input(s) 506 via which any type of data or inputs can be received, such as user-selectable inputs and any other type of audio, video, and/or image data that can then be processed, rendered, and/or displayed for viewing.

Device 500 can also include communication interface(s) 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices can communicate data with device 500.

Device 500 can include one or more processors 510 (e.g., any of microprocessors, controllers, and the like) which process various computer-executable instructions to control the operation of device 500 and to implement embodiments of a combined image and text document. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 can also include computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like. Device 500 may also include a mass storage media 516.

Computer-readable media 514 provides data storage mechanisms to store the device content 504, as well as various device applications 518 and any other types of information and/or data related to operational aspects of device 500. For example, an operating system 520 can be maintained as a computer application with the computer-readable media 514 and executed on the processors 510. The device applications 518 can also include a device manager 522, a character recognition application 524, a scanning application 526, and a display application 528. In this example, the device applications 518 are shown as software modules and/or computer applications that can implement various embodiments of a combined image and text document.

Device 500 can also include an audio, video, and/or image processing system 530 that provides audio data to an audio system 532 and/or provides video or image data to a display system 534. The audio system 532 and/or the display system 534 can include any devices or components that process, display, and/or otherwise render audio, video, and image data. The audio system 532 and/or the display system 534 can be implemented as integrated components of device 500. Alternatively, audio system 532 and/or the display system 534 can be implemented as external components to device 500. Video signals and audio signals can be communicated from device 500 to an audio device and/or to a display device via an RF (radio frequency) link, S-video link, composite video link, component video link, DVI (digital video interface), analog audio connection, or other similar communication link.

Although embodiments of a combined image and text document have been described in language specific to features and/or methods, it is to be understood that the subject of the appended claims is not necessarily limited to the specific features or methods described. Rather, the specific features and methods are disclosed as example implementations of a combined image and text document.

The invention claimed is:

1. A method, comprising:
   generating a scanned image of a document utilizing a scanning application;
   generating text representations of text that is included in the document utilizing a character recognition application;
   correlating position data of the text representations with locations of corresponding text in the scanned image of the document;
   rendering the scanned image for display overlaid with the text representations that are displayed as a transparent overlay over the scanned image, the scanned image and the text representations being independently user-selectable for display;
   searching for selected text in the text representations; and
   highlighting the selected text in the transparent overlay to display an appearance that corresponding text in the scanned image is highlighted.

2. A method as recited in claim 1, further comprising generating a markup document that includes the text representations, associated display alignment information, and a reference to the scanned image for display.

3. A method as recited in claim 1, further comprising receiving a user-selectable input to display at least one of the text representations without the scanned image, or the scanned image without the text representations.

4. A method as recited in claim 1, further comprising receiving a user-selectable input to display the text representations adjacent the scanned image.

5. A method as recited in claim 1, further comprising rendering the text representations as a visual overlay for display over the scanned image to illustrate a comparison of the text representations with the corresponding text in the scanned image that reflects an accuracy of the character recognition application.

6. A method as recited in claim 5, wherein the scanned image is displayed in a first color overlaid with the text representations displayed in a second color that contrasts with the first color to further illustrate the comparison of the text representations with the corresponding text in the scanned image.

7. A method as recited in claim 5, further comprising receiving a user-selectable input to display at least one of the text representations without the scanned image, or the scanned image without the text representations as the visual overlay.

8. A document representation system, comprising:
   a scanned image of a document generated by a scanning application;
   a character recognition application configured to generate text representations of text that is included in the document, and correlate position data of the text representations with locations of corresponding text in the scanned image of the document; and
   a display application configured to:
   initiate a display of the scanned image overlaid with the text representations as a transparent overlay, the scanned image and the text representations being independently user-selectable for display; and
   receive a user-selectable input to initiate the display of the text representations adjacent the scanned image.

9. A document representation system as recited in claim 8, wherein the display application is further configured to generate a markup document that includes the text representations, associated display alignment information, and a reference to the scanned image for display.

10. A document representation system as recited in claim 8, wherein the display application is further configured to receive a user-selectable input to initiate the display of at least one of the text representations without the scanned image, or the scanned image without the text representations.

11. A document representation system as recited in claim 8, wherein the display application is further configured to initiate the display of the text representations as a visual overlay for display over the scanned image to illustrate a comparison of the text representations with the corresponding text in the scanned image that reflects an accuracy of the character recognition application.

12. A document representation system as recited in claim 11, wherein the display application is further configured to initiate the display of the scanned image in a first color overlaid with the text representations displayed in a second color that contrasts with the first color to further illustrate the comparison of the text representations with the corresponding text in the scanned image.

13. A document representation system as recited in claim 8, wherein the display application is further configured to:
   receive a text search request for selected text;

initiate a search for the selected text in the text representations that are displayed in the transparent overlay of the scanned image; and highlight the transparent overlay of the selected text to display an appearance that the corresponding text in the scanned image is highlighted.

14. One or more computer-readable storage media devices comprising computer-executable instructions that, when executed, direct a display application to:

initiate display of a scanned image of a document generated by a scanning application;

initiate display of text representations over the scanned image as a transparent overlay, the text representations generated from text that is included in the document and generated by a character recognition application; and receive a user-selectable input to initiate the display of at least one of the text representations without the scanned image, or the scanned image without the text representations.

15. One or more computer-readable storage media devices as recited in claim 14, further comprising computer-executable instructions that, when executed, direct the display application to initiate the display of the text representations as a visual overlay for display over the scanned image to illustrate a comparison of the text representations with the corresponding text in the scanned image that reflects an accuracy of the character recognition application.

16. One or more computer-readable storage media devices as recited in claim 15, further comprising computer-executable instructions that, when executed, direct the display application to initiate the display of the scanned image in a first color overlaid with the text representations displayed in a second color that contrasts with the first color to further illustrate the comparison of the text representations with the corresponding text in the scanned image.

17. One or more computer-readable storage media devices as recited in claim 15, further comprising computer-executable instructions that, when executed, direct the display application to receive the user-selectable input to initiate the display of the scanned image without the text representations as the visual overlay.

18. One or more computer-readable storage media devices as recited in claim 14, further comprising computer-executable instructions that, when executed, direct the display application to:

receive a text search request for selected text;

initiate a search for selected text in the text representations that are displayed in the transparent overlay of the scanned image; and highlight the transparent overlay of the selected text to display an appearance that the corresponding text in the scanned image is highlighted.

* * * * *